(12) United States Patent
Zhao et al.

(10) Patent No.: US 11,685,408 B1
(45) Date of Patent: Jun. 27, 2023

(54) DRIVING DIFFICULTY HEAT MAPS FOR AUTONOMOUS VEHICLES

(71) Applicant: Waymo LLC, Mountain View, CA (US)

(72) Inventors: Xiaoyue Zhao, Saratoga, CA (US); Henning Hohnhold, San Francisco, CA (US); Yin-Hsiu Chen, San Francisco, CA (US); Xiang Gao, Mountain View, CA (US); Ajay Joshi, Mountain View, CA (US); Kevin Cao, Mountain View, CA (US)

(73) Assignee: WAYMO LLC, Mountain View, CA (US)

( * ) Notice: Subject to any disclaimer, the term of this patent is extended or adjusted under 35 U.S.C. 154(b) by 184 days.

(21) Appl. No.: 17/347,685

(22) Filed: Jun. 15, 2021

(51) Int. Cl.
 *G07C 5/02* (2006.01)
 *B60W 60/00* (2020.01)
 *G01C 21/00* (2006.01)

(52) U.S. Cl.
 CPC ....... *B60W 60/005* (2020.02); *G01C 21/3841* (2020.08); *G07C 5/02* (2013.01); *B60W 2556/40* (2020.02); *B60W 2556/45* (2020.02)

(58) Field of Classification Search
 CPC combination set(s) only.
 See application file for complete search history.

(56) References Cited

U.S. PATENT DOCUMENTS

| | | |
|---|---|---|
| 10,551,847 B2 | 2/2020 | Stenneth et al. |
| 2019/0113920 A1 | 4/2019 | England et al. |
| 2020/0019161 A1 | 1/2020 | Stenneth |

FOREIGN PATENT DOCUMENTS

| | | |
|---|---|---|
| EP | 3451312 A2 | 3/2019 |

*Primary Examiner* — Vivek D Koppikar
*Assistant Examiner* — Jeffrey R Chalhoub
(74) *Attorney, Agent, or Firm* — Botos Churchill IP Law LLP

(57) ABSTRACT

Aspects of the disclosure provide for the generation of a driving difficulty heat map for autonomous vehicles. For instance, log data generated by a vehicle being driven in a manual driving mode for a segment of a route may be input into a disengage model in order to generate an output identifying a likelihood of a vehicle driving in an autonomous driving mode requiring a disengage from the autonomous driving mode along the segment of the route. The log data may have been collected within a geographic area. A grid for the geographic area may be generated. The grid may include a plurality of cells. The output is assigned to one of the plurality of cells. The plurality of cells and assigned output may be used to generate a driving difficulty heat map for the geographic area.

20 Claims, 11 Drawing Sheets

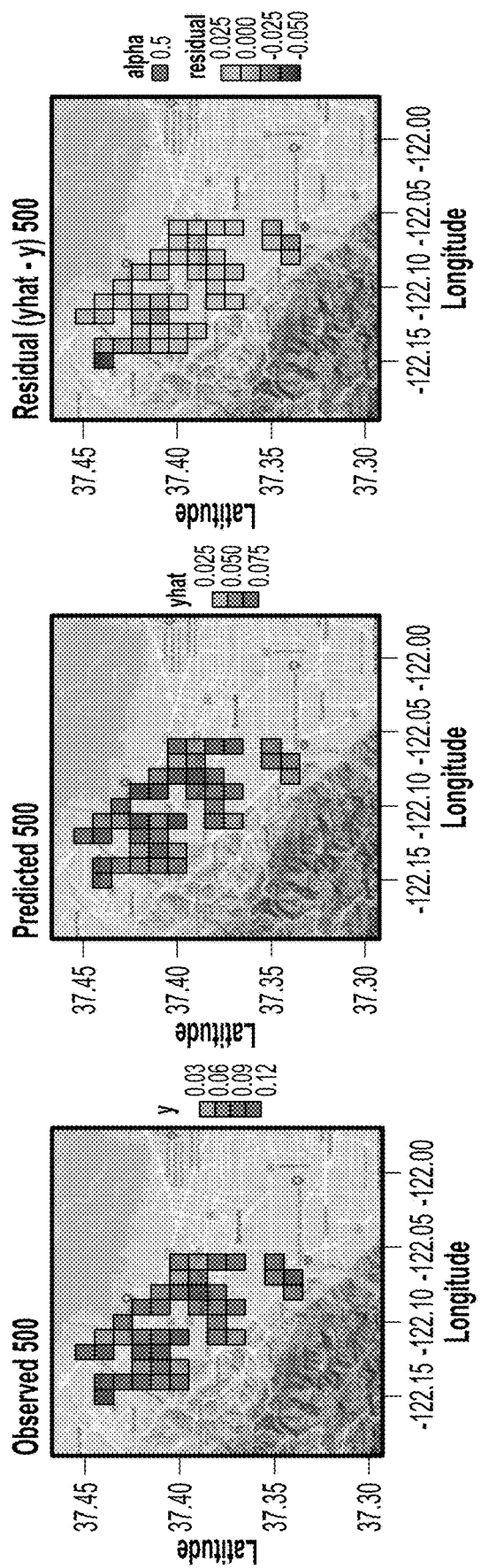

DRIVING DIFFICULTY HEAT MAPS FOR AUTONOMOUS VEHICLES

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

In order to navigate an autonomous vehicle, a routing system may determine a route from a vehicle's current location to a destination location. A planning system may then use the route to plan a short-term trajectory in order to cause the vehicle to progress along the route. Typical routing approaches may attempt to route a vehicle according to a shortest distance metric or a shortest time traveled, while routing approaches may avoid specific locations, such as highways or toll roads. However, for autonomous vehicles there may be additional considerations to consider, such as how likely the vehicle is to become stranded, how likely the vehicle is to become disengaged (i.e. require a switch from an autonomous driving mode to a manual driving mode), whether the vehicle will need to make lane changes, whether the vehicle will be making unprotected turns at traffic light-controlled intersections, etc.

BRIEF SUMMARY

Aspects of the disclosure provide a method of generating a driving difficulty heat map for autonomous vehicles. The method includes inputting, by one or more processors, log data generated by a vehicle being driven in a manual driving mode for a segment of a route into a disengage model in order to generate an output identifying a likelihood of a vehicle driving in an autonomous driving mode requiring a disengage from the autonomous driving mode along the segment of the route. The log data having been collected within a geographic area. The method also includes, generating, by the one or more processors, a grid for the geographic area, the grid including a plurality of cells; assigning, by the one or more processors, the output to one of the plurality of cells; and using, by the one or more processors, the plurality of cells and assigned output to generate a driving difficulty heat map for the geographic area.

In one example, dimensions of the cells are selected based on a length of the segment of the route. In another example, the disengage model is a machine learned model trained using log data collected by a vehicle driving in an autonomous driving mode in a second geographic area different from the geographic area. In this example, the method also includes training the disengage model using a number of different types of maneuvers from the log data. In addition or alternatively, the method also includes training the disengage model using a number of different types of maneuvers per a predetermined driving distance from the log data. In another example, the output further includes a number of likely disengages along the segment of the route. In another example, the output further includes a lane-level location of any potential disengages along that segment.

Another aspect of the disclosure provides a system for generating a driving difficulty heat map for autonomous vehicles. The system comprising one or more processors configured to input log data generated by a vehicle being driven in a manual driving mode for a segment of a route into a disengage model in order to generate an output identifying a likelihood of a vehicle driving in an autonomous driving mode requiring a disengage from the autonomous driving mode along the segment of the route. The log data having been collected within a geographic area. The one or more processors are also configured to generate a grid for the geographic area, the grid including a plurality of cells; assign the output to one of the plurality of cells; and use the plurality of cells and assigned output to generate a driving difficulty heat map for the geographic area.

In one example, dimensions of the cells are selected based on a length of the segment of the route. In another example, the disengage model is a machine learned model trained using log data collected by a vehicle driving in an autonomous driving mode in a second geographic area different from the geographic area. In another example, the one or more processors are further configured to train the disengage model using a number of different types of maneuvers from the log data. In this example, the one or more processors are further configured to train the disengage model using a number of different types of maneuvers per a predetermined driving distance from the log data. In addition or alternatively, the output further includes a number of likely disengages along the segment of the route. In another example, the output further includes a lane-level location of any potential disengages along that segment.

A further aspect of the disclosure provides a non-transitory computing device-readable medium on which instructions are stored. The instructions, when executed by one or more processors, cause the one or more processors to perform a method of generating a driving difficulty heat map for autonomous vehicles. The method includes inputting log data generated by a vehicle being driven in a manual driving mode for a segment of a route into a disengage model in order to generate an output identifying a likelihood of a vehicle driving in an autonomous driving mode requiring a disengage from the autonomous driving mode along the segment of the route. The log data having been collected within a geographic area. The method also includes generating a grid for the geographic area, the grid including a plurality of cells; assigning the output to one of the plurality of cells; and using the plurality of cells and assigned output to generate a driving difficulty heat map for the geographic area.

In one example, dimensions of the cells are selected based on a length of the segment of the route. In another example, the disengage model is a machine learned model trained using log data collected by a vehicle driving in an autonomous driving mode in a second geographic area different from the geographic area. In this example, the method further comprises training the disengage model using a number of different types of maneuvers from the log data. In addition or alternatively, the method further comprises training the disengage model using a number of different types of maneuvers per a predetermined driving distance from the log data. In another example, the output further includes a number of likely disengages along the segment of the route.

BRIEF DESCRIPTION OF THE DRAWINGS

FIGS. 9A-9C are examples of heat maps in accordance with aspects of the disclosure.

DETAILED DESCRIPTION

Overview

Figure 1:
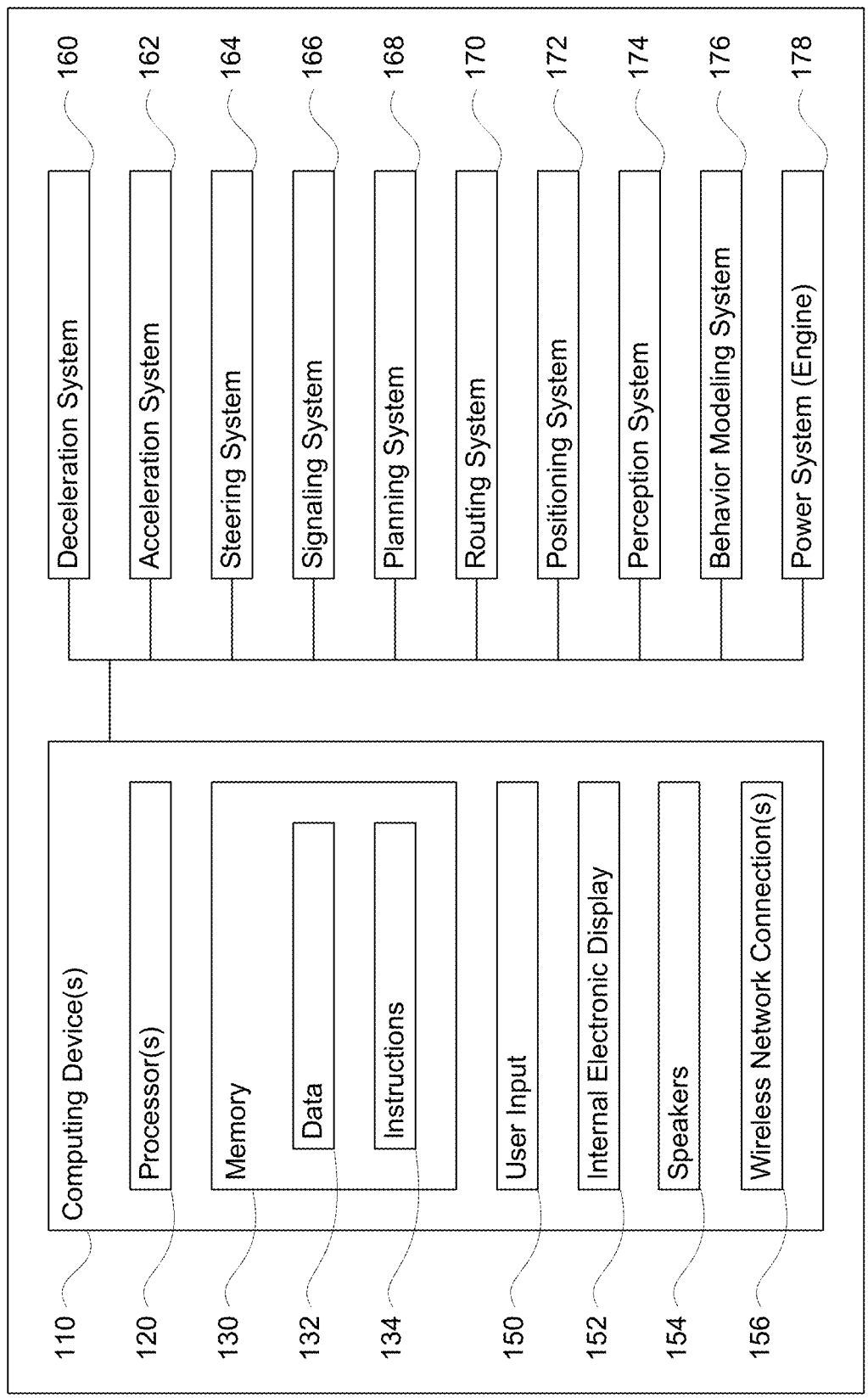
FIG. 1 is a functional diagram of an example vehicle in accordance with an exemplary embodiment.

The technology relates to understanding the driving difficulty of different locations for autonomous vehicles. For instance, models built to predict driving difficulty using map information can be used to understand the driving difficulty of different locations even before autonomous vehicles have been driven in such areas.

In this regard, a disengage model may be trained in order to determine a likelihood of a vehicle disengaging from an autonomous driving mode or rather requiring a switch to a manual or semi-autonomous driving mode. For example, training data for this model may include log data that includes messages or annotations identifying actual disengages. This log data may be collected from data generated by a vehicle's various systems. The log data may be a record of all events that occur while a vehicle is driving in an autonomous driving mode. The disengages model may then be trained using time of day information, map information, and the location of the vehicle as training inputs as well as the identified disengages as training outputs. The disengages model may be trained to identify whether a vehicle is likely to disengage at a given location and/or when the vehicle is attempting a particular maneuver. As such, the disengage model can also be used to determine a potential number of disengages for a particular route or portion of a route (e.g. a segment of a route).

The disengage model may be trained using log data for a particular geographic area and then later used to estimate the likelihood of disengages for other non-overlapping geographic areas. This may provide a proxy for the driving difficulty of those other geographic areas. Actual data generated using this approach demonstrates the ability to achieve reasonable prediction accuracy with a model trained using log data from a different geographic area. This may suggest that different geographic areas share some common driving contexts characterizing the driving difficulty.

Once trained, the disengage model may be used to determine the driving difficulty of a new geographic area. For example, log data from routes driven by human drivers in a non-autonomous driving mode as well as map information may be used as input to the disengage model in order to determine the likelihood of a disengage along such routes. The disengage model may then output information such as the likelihood of disengages along that segment, the number of likely disengages along that segment, and/or the location of any potential disengages along that segment.

The output of the disengage model may then be used to generate a disengage heat map for the new geographic area. For instance, the new geographic area may be subdivided into a plurality of cells which form a grid over the new geographic area. The output of the disengage model for each segment of a route may then be assigned to one or more of the plurality of cells depending upon the cells with which the segment of the route overlaps. The aggregated values assigned to each cell may be used to generate a driving difficulty heat map.

The driving difficulty heat maps may be used for various purposes. For instance, the driving difficulty heat maps may be used to determine which geographic areas should be excluded from a service area for the autonomous vehicles and/or to choose safer and more efficient routes. In addition, the driving difficulty heat maps can be used to select routes that are more difficult to drive in order to collect more log data more efficiently, better evaluate performance of the autonomous vehicle, and identify potential or actual issues.

Thus, the features described herein may be used to better understand the driving difficulty of different geographic locations and therefore potentially different driving situations, for instance with different driving conditions (e.g. traffic conditions) at different times of day for autonomous vehicles.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different segments of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., one or more button, mouse, keyboard, touch screen and/or microphone), various electronic displays (e.g., a monitor having a screen or any other electrical device that is operable to display information), and speakers 154 to provide information to a passenger of the vehicle 100 or others as needed. For example, electronic display 152 may be located within a cabin of vehicle 100 and may be used by computing devices 110 to provide information to passengers within vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The computing devices 110 may be part of an autonomous control system for the vehicle 100 and may be capable of communicating with various components of the vehicle in order to control the vehicle in an autonomous driving mode. For example, returning to FIG. 1, the computing devices 110 may be in communication with various systems of vehicle 100, such as deceleration system 160, acceleration system 162, steering system 164, signaling system 166, planning system 168, routing system 170, positioning system 172, perception system 174, behavior modeling system 176, and power system 178 in order to control the movement, speed, etc. of vehicle 100 in accordance with the instructions 134 of memory 130 in the autonomous driving mode.

As an example, the computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. The computing devices 110 may also use the signaling system 166 in order to signal the vehicle's intent to other drivers or vehicles, for example, by lighting turn signals or brake lights when needed.

Routing system 170 may be used by the computing devices 110 in order to generate a route to a destination using map information. Planning system 168 may be used by computing device 110 in order to generate short-term trajectories that allow the vehicle to follow routes generated by the routing system. In this regard, the planning system 168 and/or routing system 166 may store detailed map information, e.g., pre-stored, highly detailed maps identifying a road network including the shape and elevation of roadways, lane lines, intersections, crosswalks, speed limits, traffic signals, buildings, signs, real time traffic information (updated as received from a remote computing device, as such as the computing devices 410 discussed below or other computing devices), pullover spots, vegetation, or other such objects and information.

Figure 2:
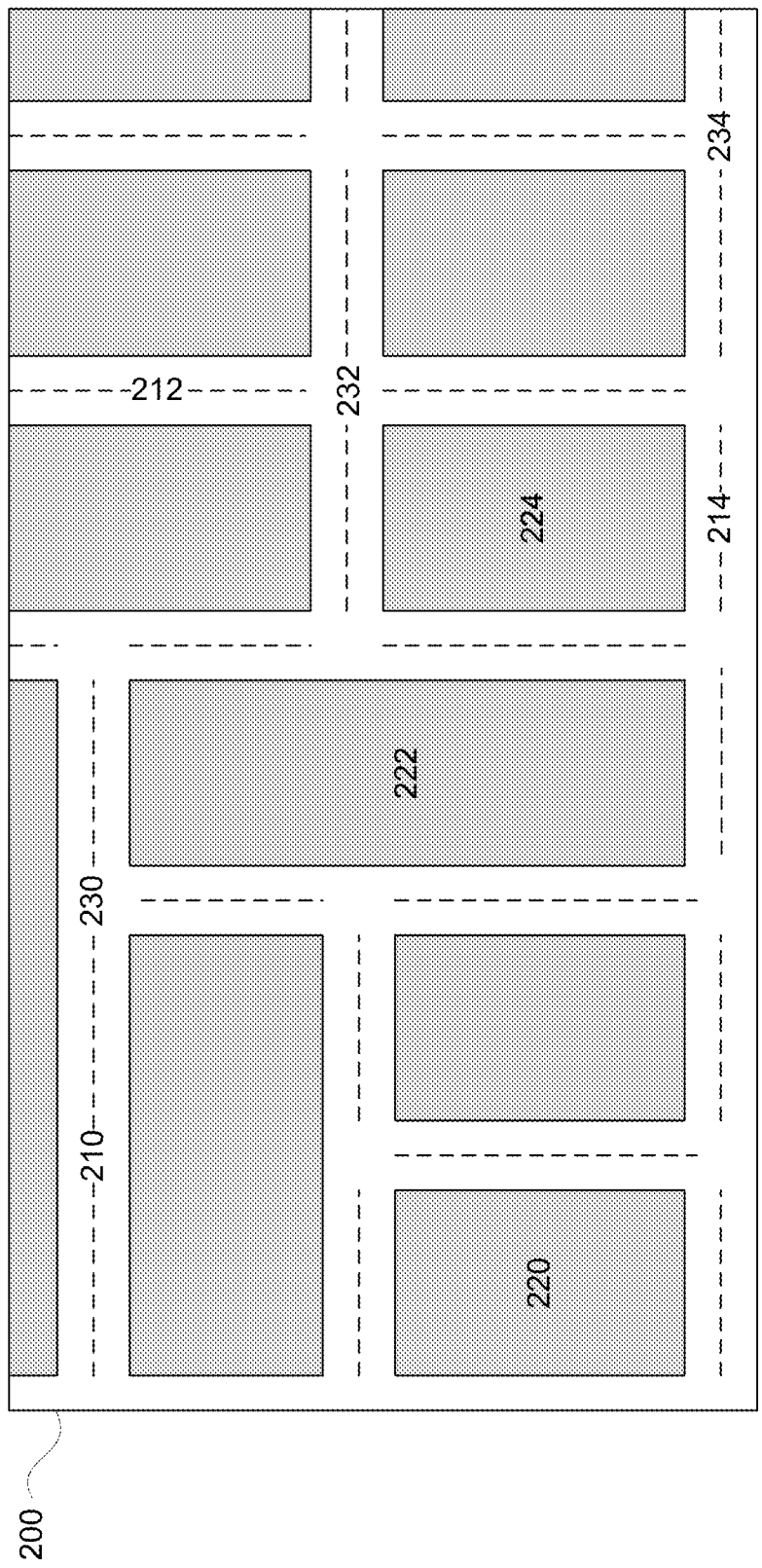
FIG. 2 is an example of map information in accordance with aspects of the disclosure.

FIG. 2 is an example of map information 200 for a section of roadway corresponding to a service area for autonomous vehicles such as vehicle 100. In this example, the map information 200 includes information identifying the shape, location, and other characteristics of lane lines represented by dashed-lines 210, 212, 214 designating roads or otherwise drivable areas, non-drivable areas (such as buildings, parks, etc.) represented by shaded areas 220, 222, 224, as well as intersections 230, 232, 234. Although only a few features are shown and identified, the map information 200 may be highly-detailed and include various additional features, including for instance the locations and boundaries of blockages as discussed further below. Although only few features are depicted in the map information 200 of FIG. 2, however, the map information 200 may include significantly more features and details in order to enable the vehicle 100 to be controlled in the autonomous driving mode.

In addition to the aforementioned physical feature information, the map information may be configured as a roadgraph which includes a plurality of graph nodes and edges representing road or lane segments that together make up the road network of the map information. Each edge is defined by a starting graph node having a specific geographic location (e.g. latitude, longitude, altitude, etc.), an ending graph node having a specific geographic location (e.g. latitude, longitude, altitude, etc.), and a direction. This direction may refer to a direction the vehicle 100 must be moving in in order to follow the edge (i.e. a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same lane or changing lanes. Each node and edge may have a unique identifier, such as a latitude and longitude location of the node or starting and ending locations or nodes of an edge. In addition to nodes and edges, the map may identify additional information such as types of maneuvers required at different edges as well as which lanes are drivable.

The routing system 166 may use the aforementioned map information to determine a route from a current location (e.g. a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each route may include a list of a plurality of nodes and edges which the vehicle can use to reach the destination. Routes may be recomputed periodically as the vehicle travels to the destination.

The map information used for routing may be the same or a different map as that used for planning trajectories. For example, the map information used for planning routes not only requires information on individual lanes, but also the nature of lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g. because it is faster) and therefore be preferable.

Positioning system 170 may be used by computing devices 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of the roadgraph as well as relative location information, such as location relative to other cars immediately around it which can often be determined with less noise that absolute geographical location.

The positioning system 172 may also include other devices in communication with the computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 174 also includes one or more components for detecting objects external to the vehicle such as other vehicles, obstacles in the roadway, traffic signals, signs, trees, etc. For example, the perception system 174 may include LIDARs, sonar, radar, cameras and/or any other detection devices that record data which may be processed by the computing devices of the computing devices 110. In the case where the vehicle is a passenger vehicle such as a minivan, the minivan may include a laser or other sensors mounted on the roof or other convenient location.

Figure 3:
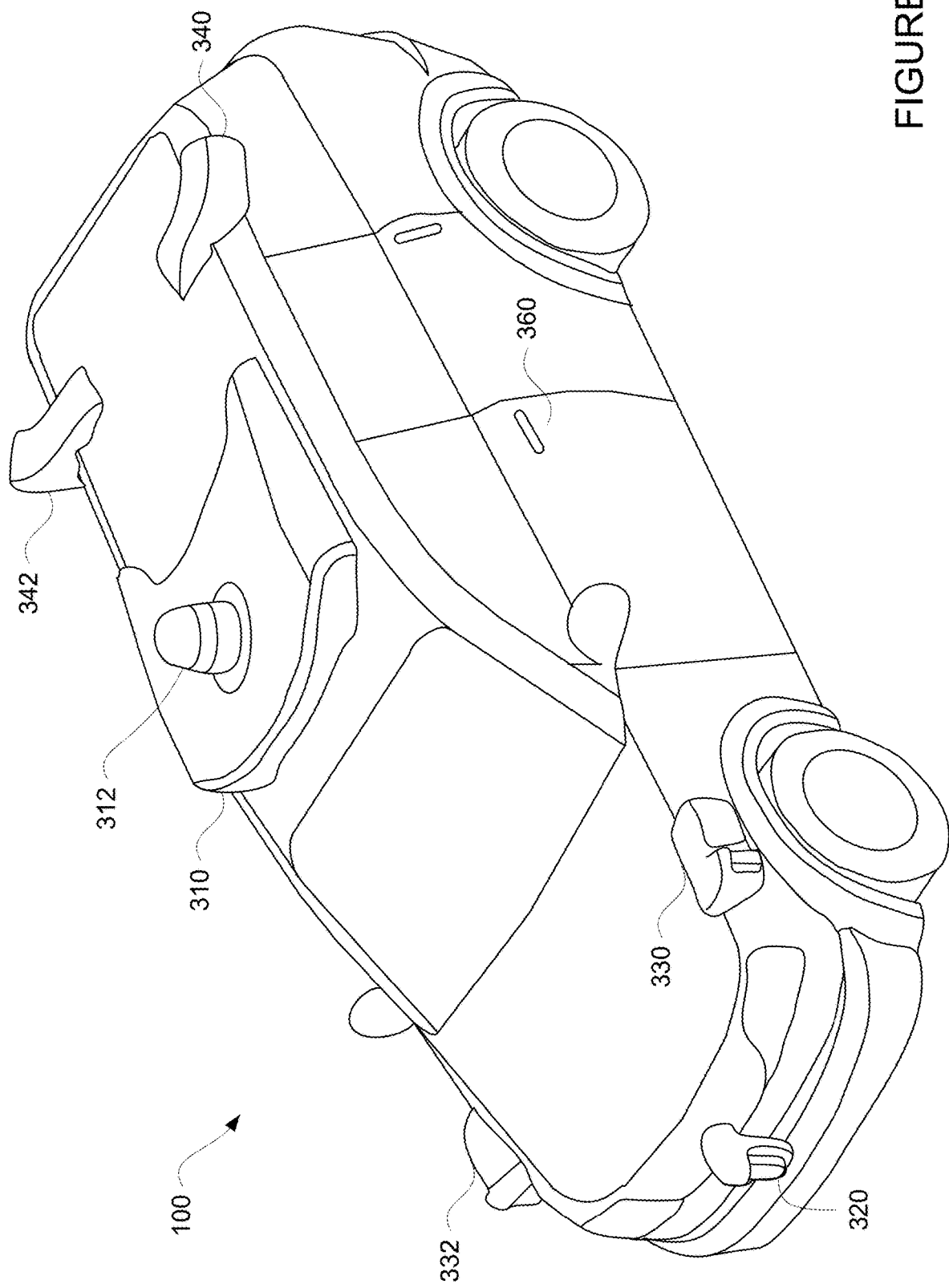
FIG. 3 is an example external view of a vehicle in accordance with aspects of the disclosure.

For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The computing devices 110 may be capable of communicating with various components of the vehicle in order to control the movement of vehicle 100 according to primary vehicle control code of memory of the computing devices 110. For example, returning to FIG. 1, the computing devices 110 may include various computing devices in communication with various systems of vehicle 100, such as deceleration system 160, acceleration system 162, steering system 164, signaling system 166, planning system 168, routing system 170, positioning system 172, perception system 174, behavior modeling system 176, and power system 178 (i.e. the vehicle's engine or motor) in order to control the movement, speed, etc. of vehicle 100 in accordance with the instructions 134 of memory 130.

The various systems of the vehicle may function using autonomous vehicle control software in order to determine how to and to control the vehicle. As an example, a perception system software module of the perception system 174 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module of the behavior modeling system 176 which uses various behavior models based on object type to output a predicted future behavior for a detected object. In other instances, the characteristics may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle. Detected objects, predicted future behaviors, various likelihoods from detection system software modules, the map information identifying the vehicle's environment, position information from the positioning system 170 identifying the location and orientation of the vehicle, a destination location or node for the vehicle as well as feedback from various other systems of the vehicle may be input into a planning system software module of the planning system 168. The planning system 168 may use this input to generate trajectories for the vehicle to follow for some brief period of time into the future based on a route generated by a routing module of the routing system 170. In this regard, the trajectories may define the specific characteristics of acceleration, deceleration, speed, etc. to allow the vehicle to follow the route towards reaching a destination. A control system software module of the computing devices 110 may be configured to control movement of the vehicle, for instance by controlling braking, acceleration and steering of the vehicle, in order to follow a trajectory.

The computing devices 110 may control the vehicle in an autonomous driving mode by controlling various components. For instance, by way of example, the computing devices 110 may navigate the vehicle to a destination location completely autonomously using data from the detailed map information and planning system 168. The computing devices 110 may use the positioning system 170 to determine the vehicle's location and perception system 174 to detect and respond to objects when needed to reach the location safely. Again, in order to do so, computing device 110 and/or planning system 168 may generate trajectories and cause the vehicle to follow these trajectories, for instance, by causing the vehicle to accelerate (e.g., by supplying fuel or other energy to the engine or power system 178 by acceleration system 162), decelerate (e.g., by decreasing the fuel supplied to the engine or power system 178, changing gears, and/or by applying brakes by deceleration system 160), change direction (e.g., by turning the front or rear wheels of vehicle 100 by steering system 164), and signal such changes (e.g., by lighting turn signals) using the signaling system 166. Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
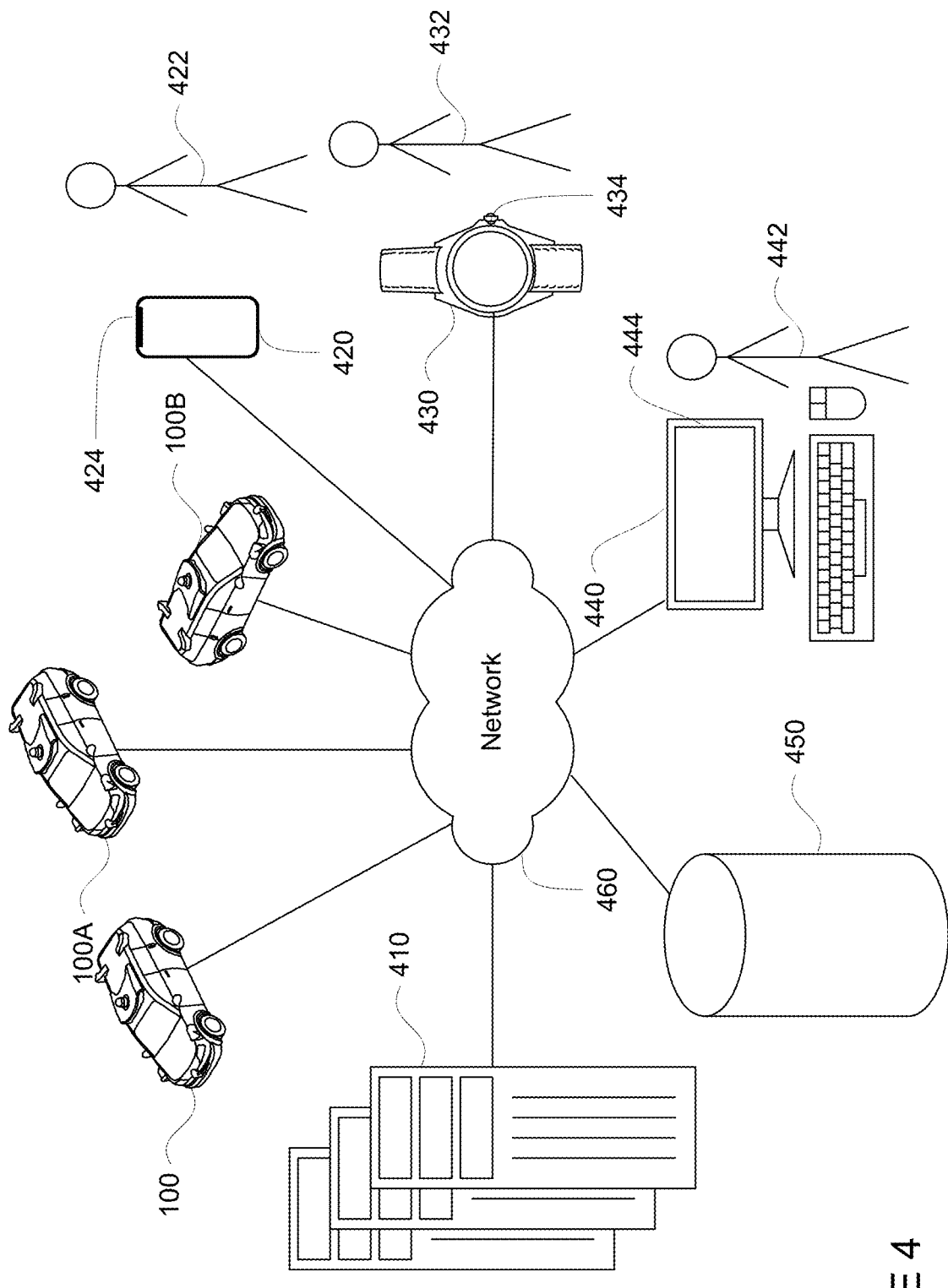
FIG. 4 is a pictorial diagram of an example system in accordance with aspects of the disclosure.
Figure 5:
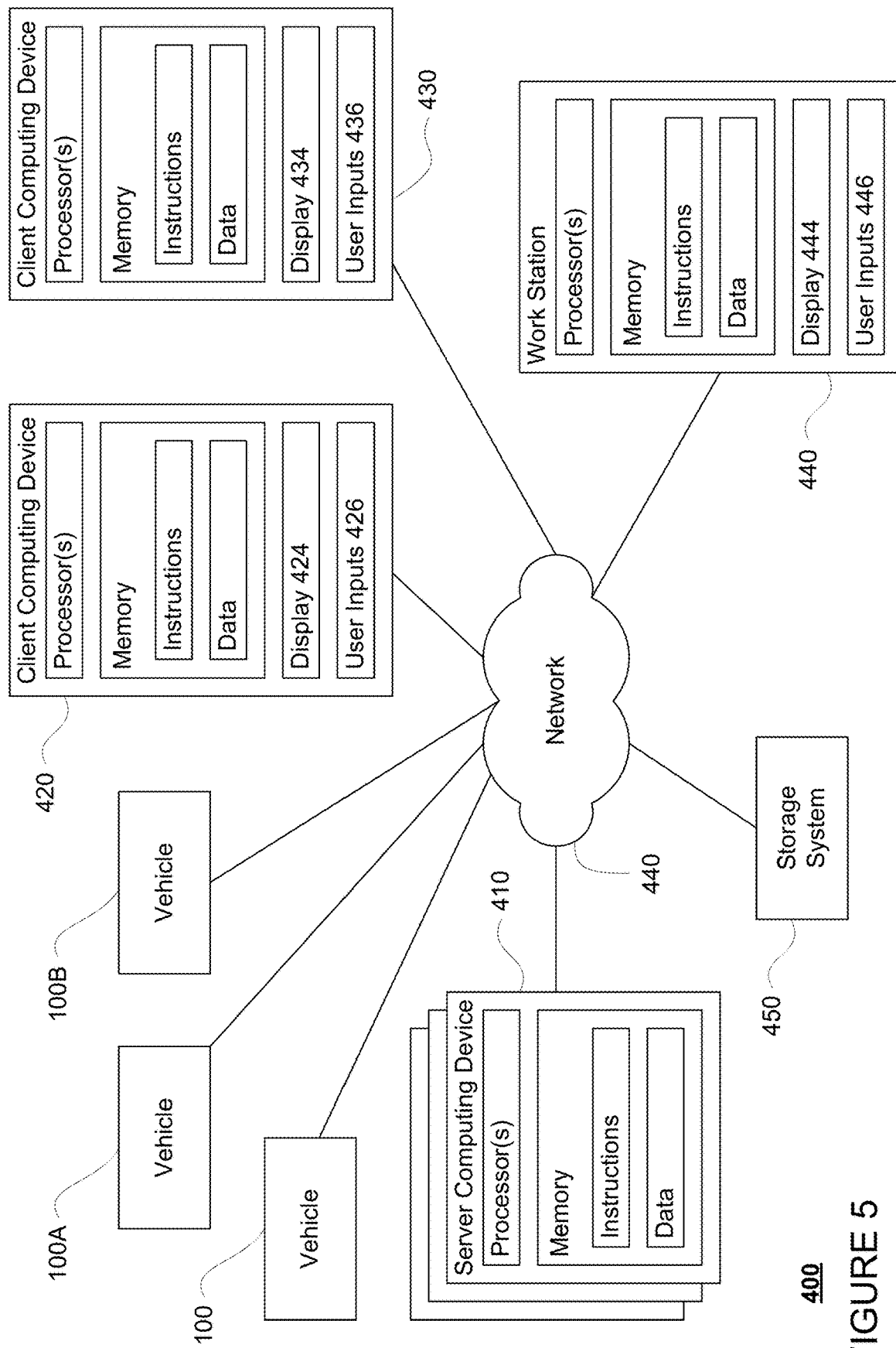
FIG. 5 is a functional diagram of the system of FIG. 4 in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100A and vehicle 100B, which may be configured the same as or similarly to vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening graph nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A or vehicle 100B as well as computing devices 420, 430, 440 via the network 460. For example, vehicles 100, 100A, 100B, may be a part of a fleet of vehicles that can be dispatched by server computing devices to various locations. In this regard, the server computing devices 410 may function as a fleet management system which can be used to dispatch vehicles such as vehicles 100, 100A, 100B to different locations in order to pick up and drop off passengers. In addition, the computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 3, each client computing device 420, 430 may be a personal computing device intended for use by a user 422, 432 and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 3. As an example the user may input information using a small keyboard, a keypad, microphone, using visual signals with a camera, or a touch screen. As yet another example, client computing device 440 may be a desktop computing system including a keyboard, mouse, camera and other input devices.

Each of the client computing devices may be a remote computing device used by a person (e.g. human operators or users 422, 432, 442) to review and analyze sensor data and other information generated by a perception system of a vehicle such as perception system 174 of vehicle 100. For example, user 442 may use the client computing device 440 to review output values and heat maps generated as discussed herein. Although only a few remote computing devices are shown in FIGS. 4 and 5, any number of such work stations may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 3 and 4, and/or may be directly connected to or incorporated into any of the computing devices 110, 410, 420, 430, 440, etc.

Storage system 450 may store various types of information as described in more detail below. This information may be retrieved or otherwise accessed by a server computing device, such as one or more server computing devices 410, in order to perform some or all of the features described herein. For example, the storage system 450 may also store a version of the aforementioned detailed map information (e.g. the map information 200) including all or some of the features discussed above.

Storage system 450 may store various types of information as described in more detail below. This information may be retrieved or otherwise accessed by a server computing device, such as one or more server computing devices 410, in order to perform some or all of the features described herein. For instance, the storage system may store various models, including the disengage model discussed further below.

In addition, storage system 450 may store various types of information as described in more detail below. This information may be retrieved or otherwise accessed by a server computing device, such as one or more server computing devices 410, in order to perform some or all of the features described herein. For instance, storage system 450 may store log data. This log data may include data generated by the various systems of a vehicle, such as vehicle 100, while the vehicle is being operated in a manual driving mode or an autonomous driving mode. For instance, the log data may include sensor data generated by a perception system, such as perception system 174 of vehicle 100. As an example, the sensor data may include raw sensor data as well as data identifying defining characteristics of perceived objects such as shape, location, orientation, speed, etc. of objects such as vehicles, pedestrians, bicyclists, vegetation, curbs, lane lines, sidewalks, crosswalks, buildings, etc.

The log data may also include "event" data identifying different types of events such as collisions or near collisions with other objects, planned trajectories describing a planned geometry and/or speed for a potential path of the vehicle, actual locations of the vehicle at different times, actual orientations/headings of the vehicle at different times, actual speeds, accelerations and decelerations of the vehicle at different times, classifications of and responses to perceived objects, behavior predictions of perceived objects, status of various systems (such as acceleration, deceleration, perception, steering, signaling, routing, planning, power, etc.) of the vehicle at different times including logged errors, inputs to and outputs of the various systems of the vehicle at different times, etc. In this regard, the log data may identify disengages, or events where an autonomous vehicle transitioned from an autonomous driving mode to a manual driving mode either automatically (e.g. if the vehicle's computing devices detect an internal error or another problem such as where the vehicle is approaching an unmapped area) or because a test driver in the vehicle took control of the vehicle.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 11:
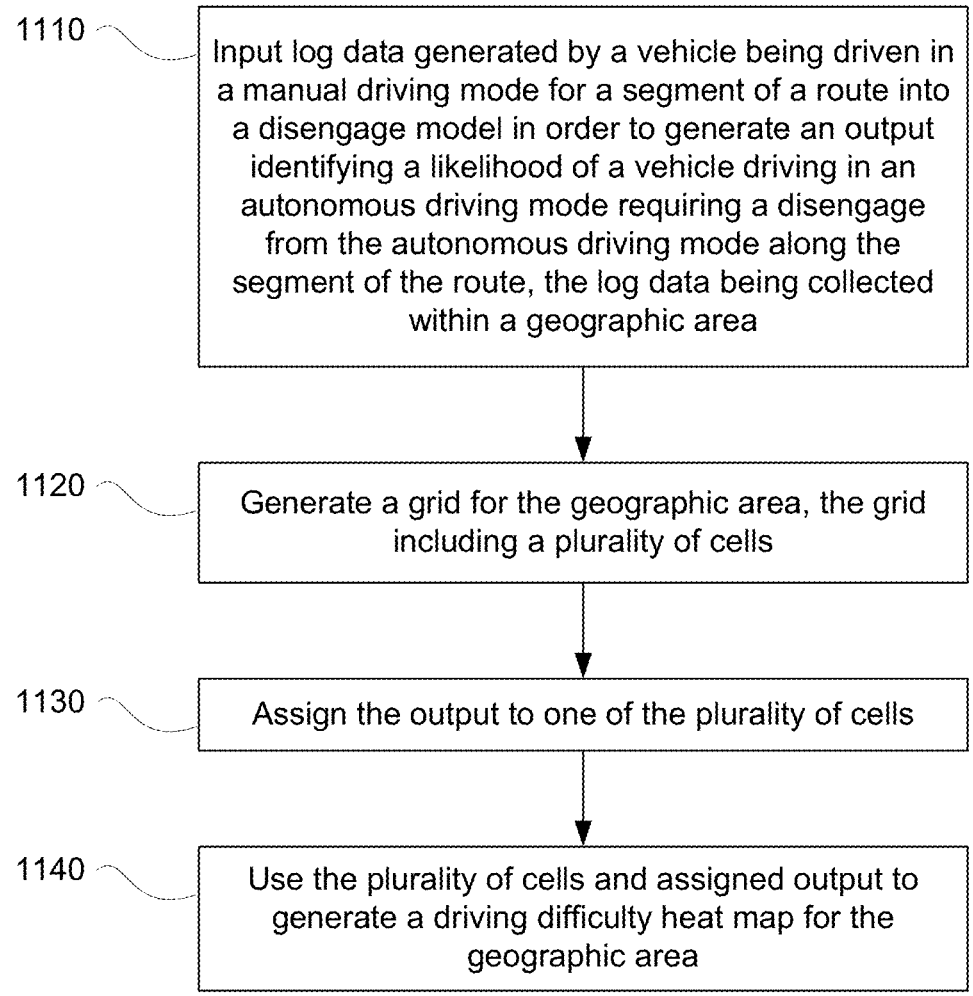
FIG. 11 is an example flow diagram in accordance with aspects of the disclosure.

FIG. 11 is an example flow diagram 1100 for of generating a driving difficulty heat map for autonomous vehicles, which may be performed by one or more processors of one or more computing devices, such as the processors of the server computing devices 410 or the processors of any of the client computing devices 420, 430, 440. At block 1110, log data generated by a vehicle being driven in a manual driving mode for a segment of a route is input into a disengage model in order to generate an output identifying a likelihood of a vehicle driving in an autonomous driving mode requiring a disengage from the autonomous driving mode along the segment of the route. This log data is collected within a geographic area.

The disengage model of storage system 450 may be a machine learned model such as a deep neural network or other models. As noted above, the disengage model may be trained in order to determine a likelihood of a vehicle disengaging from an autonomous driving mode or rather requiring a switch to a manual or semi-autonomous driving mode. For example, training data for this model may include log data that includes messages or annotations identifying disengage events including the location where the disengage event occurred. This log data may be collected from data generated by a vehicle's various systems when the vehicle is driven in an autonomous driving mode or when the vehicle is driven in an autonomous driving mode. For instance, the log data may be a record of all events, including disengage events, that occur while a vehicle is driving in an autonomous driving mode. This may include information such as locations, routes, trajectories, speeds, accelerations, decelerations, turning behaviors, detected objects (such as other vehicles and therefore traffic conditions), as well as various messages or annotations generated by the vehicle's various systems.

The disengages model may then be trained using time of day information, map information, and the location of the vehicle when a disengage event occurred. For instance, depending upon the desired output of the mile (e.g. number of disengages or likelihood of disengaging whole route or portion of a route), the entire route may be input used to train the model or, alternatively, a smaller portion of a route may be used to train the model. For instance, if the desired output of the model is for 0.25-mile segments, each route may be divided into 0.25-mile segments. The disengage could happen any place in the segment. For even greater granularity (e.g. at lane-level), even shorter segments may be used in order to achieve better association between specific features in the map (e.g. an edge in the roadgraph of a specific segment of a lane) and the disengage. Thus the entire route or the aforementioned segments may be used as training inputs, and the identified disengage events (corresponding to a given route or segment) may be as training outputs. The map information may include information such as the type of road (such as surface street or highway), number of lanes, lane width, etc. In some instances, the disengage model may also use information such as traffic conditions (such as traffic density or the number of other vehicles around) as training inputs. The disengages model may be trained to identify whether a vehicle is likely to disengage at a given location and/or when the vehicle is attempting a particular maneuver. As such, the disengage model can also be used to determine a potential number of disengages for a particular route as well as the locations of those disengages. In addition, when traffic conditions are provided, the output of the model may be specific to a certain amount of traffic density.

As a refinement to the aforementioned disengage model, the training inputs may also include characteristics of a route or segment of a route. The aforementioned characteristics may include information such as the number of different types of maneuvers (e.g. unprotected left and/or right turns, lane changes, merges, etc.) per mile or during the entire route. In some instances, to provide more useful results, when analyzing an entire route (rather than smaller segment of a route), these characteristics may be aggregated together to determine the total number along the route (e.g. the number of lane changes, the number of left and right turns, the portion of miles on roads with low-speed limit etc.) in order to input this information into the disengage model to determine the likelihood of a disengage.

In this regard, the disengage model may output a likelihood of a disengage occurring along a particular route or segment of a route, a potential number of disengages for a particular route or segment of a route.

In addition, as indicated above, whereas some models may provide information about an entire route, using a segment of a route, such as 0.25 mile or more or less segment of a route, as compared to analyzing an entire route using the disengage model, may improve the signal to noise ratio of the output of the disengage model. In addition, by utilizing even shorter segments of a route, such as less than 0.25 mile, or a lane on the route, the disengage model can be used to determine a likelihood of a disengage occurring at lane level. For instance, the disengage model may, for a given route and time of day, output a number of disengages likely to occur or the likelihood of a disengage for each graph feature along a route (e.g. each roadgraph edge). The likelihood may be a value on a range from 0 to 1, 1 being very likely and 0 being not likely at all. Of course, other scales and values may also be used. Moreover, by using smaller segments of routes, this avoids the need to aggregate characteristics of a route (e.g. the number of lane changes, the number of left and right turns, etc.) in order to determine the likelihood of a disengage.

Once trained, the disengage model may be used to determine the driving difficulty of a new geographic area. In other words, the disengage model may be trained using log data for a particular geographic area and then later used to estimate the likelihood of disengages for other non-overlapping geographic areas. Thus, the disengage model may provide a proxy for the driving difficulty of those other geographic areas. For example, log data from routes driving by human drivers in a non-autonomous driving mode as well as map information may be used as input to the disengage model in order to determine the likelihood of a disengage along such routes. This map information may be similar to the map information discussed above, for instance, arranged as a roadgraph with various features. At least some of these features may be labeled manually by human operators and others may be algorithmically generated from log data generated by vehicles operating in manual or autonomous driving modes. Again, rather than using an entire route, a smaller segment of a route, such as 0.25 mile or more or less segments of a route, may be input into the disengage model. The disengage model may then output information such as the likelihood of disengages along that segment, the number of likely disengages along that segment, and/or the location of any potential disengages along that segment. Moreover, such a "segment-level" mode can always be used to derive predictions at route level, since each route can be divided into segments and outputs generated for each segment can be summed up to determine what the output would have been for the route level.

Figure 6:
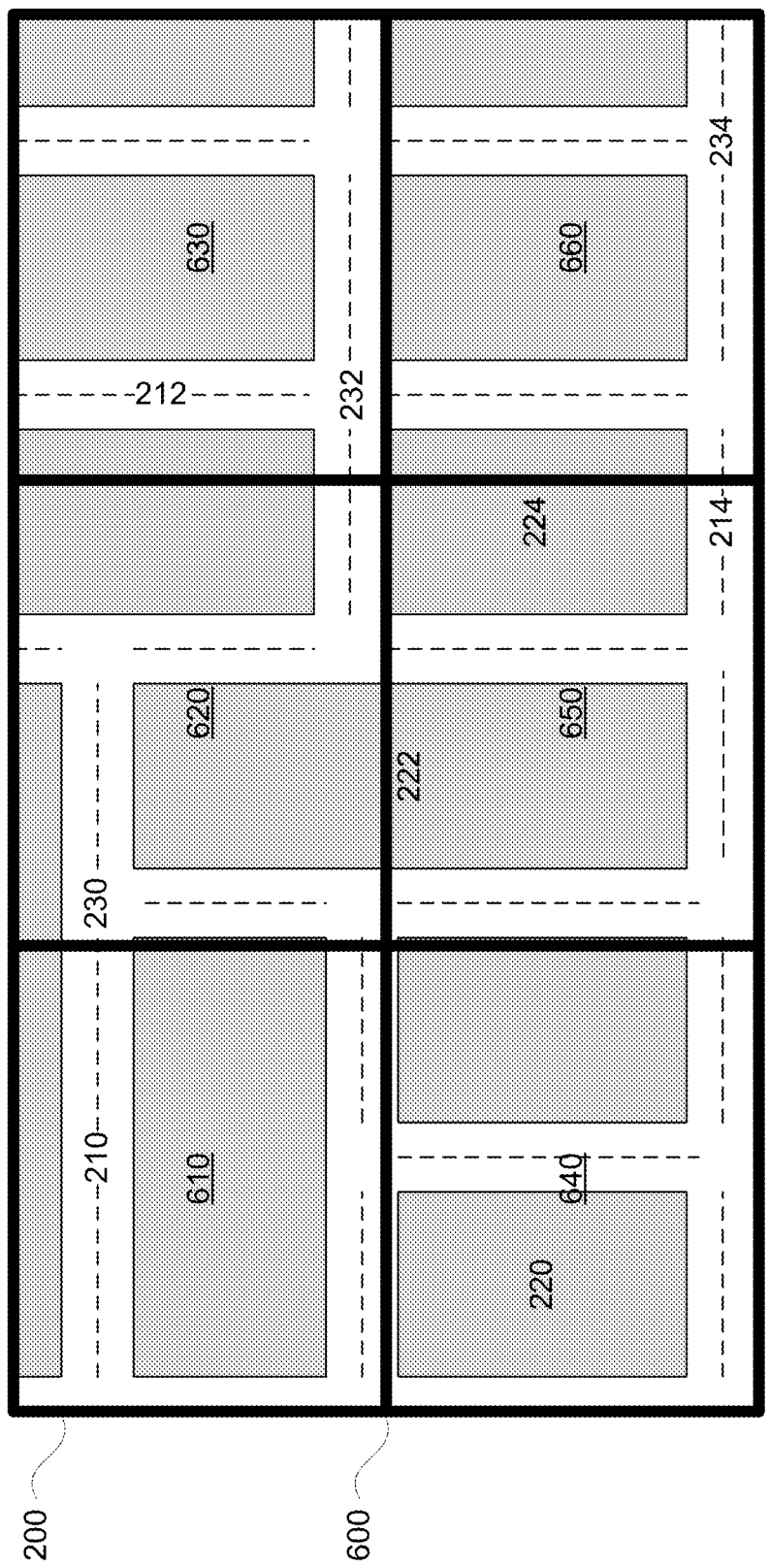
FIG. 6 is an example of a grid and map information in accordance with aspects of the disclosure.

Returning to FIG. 11, at block 1120, a grid for the geographic area is generated. This grid includes a plurality of cells. The output of the disengage model may then be used to generate a disengage heat map for the new geographic area. For instance, the new geographic area may be subdivided into plurality of cells which form a grid over the new geographic area. In this regard, each cell will correspond to a fixed geographic area. When utilizing segments of 0.25 mile, the size of the cells may be selected to be 0.75 mile by 0.75 mile or more. In this regard, the cells may be square or rectangular cells. Alternatively, S2 cells at an appropriate level for the desired dimensions may be used. Similarly, when using much smaller segments in order to achieve lane-level granularity, the cells may be larger or smaller. As an example, FIG. 6 depicts the area of map information 200 divided into a grid 600 including a plurality of cells 610, 620, 630, 640, 650, 660, each representing a sub-portion of the grid 600.

Returning to FIG. 11, at block 1130, the output is assigned to one of the plurality of cells. The output of the disengage model for each segment of a route may then be assigned to one or more of the plurality of cells depending upon which geographic area of the cells with which the segment of the route overlaps. These assignments may thus depend upon the granularity of the segments of cells. For instance, for a model using 0.25-mile segments, these segments are typically completely within a single cell, though a small percentage may overlap with more than one cells. In such instances, the output of the model (e.g. the segment level prediction) may be split into the overlapping cells proportional to miles fraction in each cell. For even smaller segments, because the output is very fine grained, there is unlikely to be any overlap.

Figure 7:
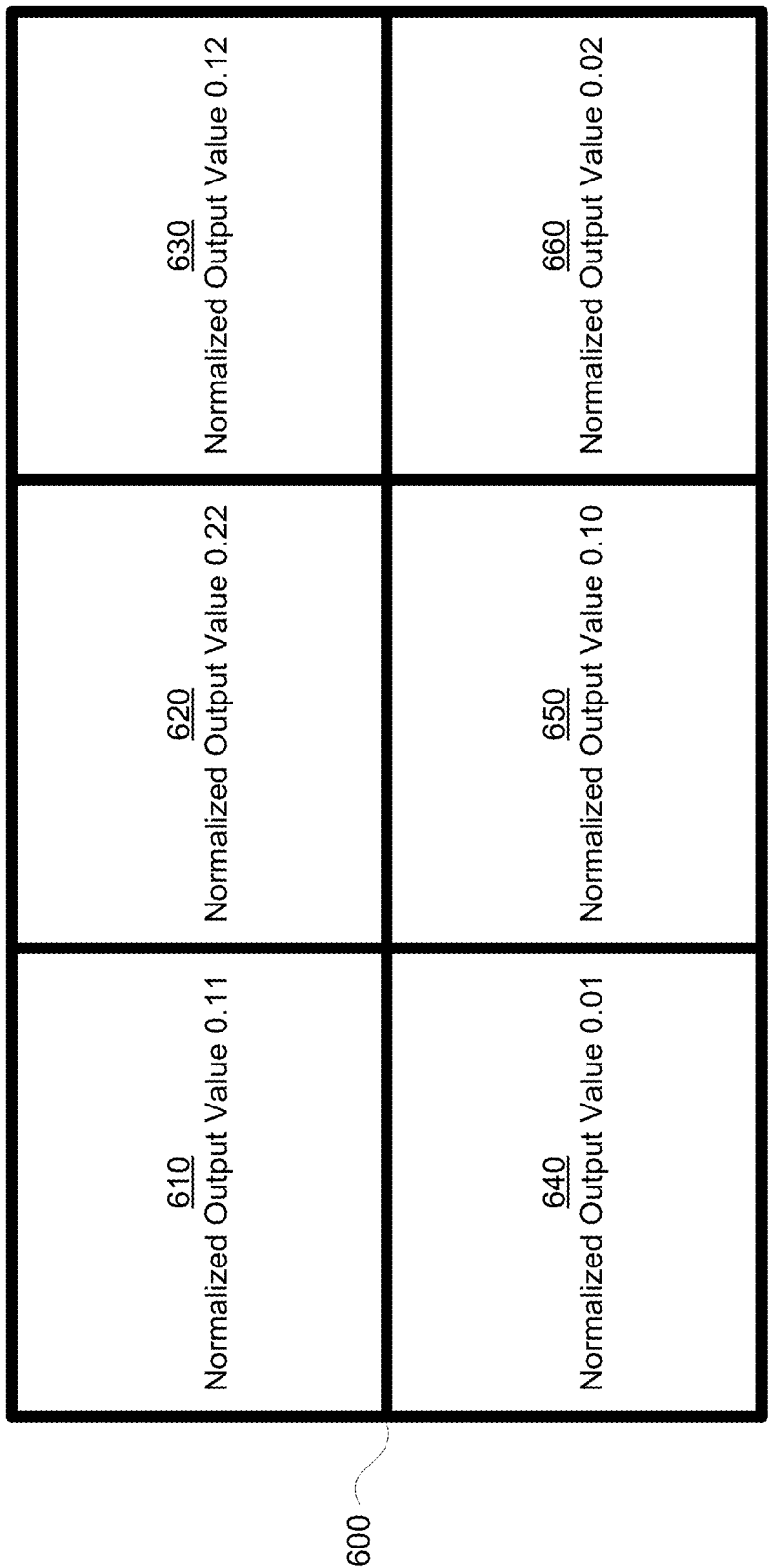
FIG. 7 is an example of a grid and values in accordance with aspects of the disclosure.
Figure 8:
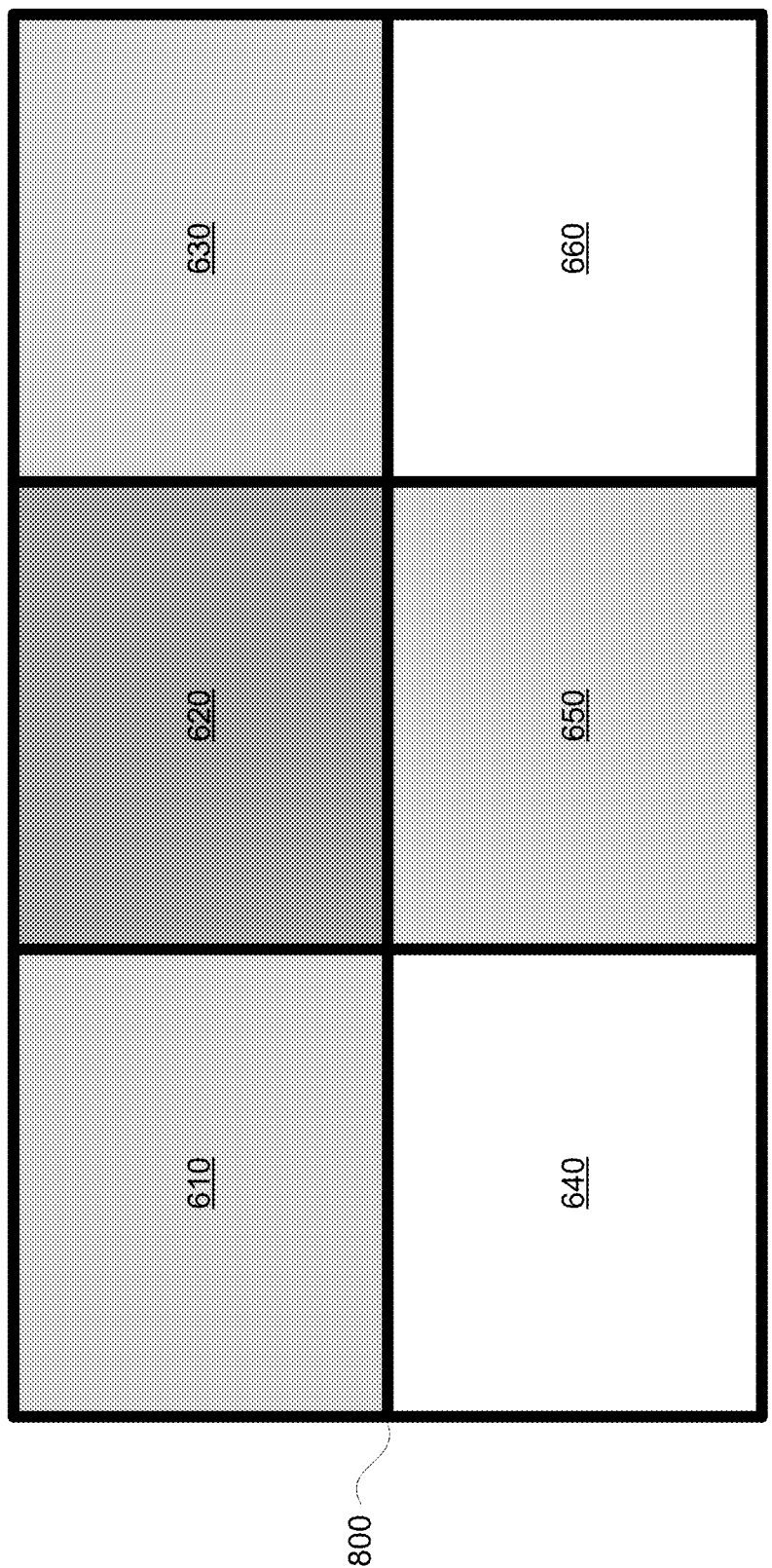
FIG. 8 is an example of a heat map in accordance with aspects of the disclosure.

Returning to FIG. 11, at block 1140, the plurality of cells and assigned output are used to generate a driving difficulty heat map for the geographic area. The aggregated values assigned to each cell may be used to generate a driving difficulty heat map. For instance, the output values (e.g. the predicted number of disengages per mile) may be summed together and normalized by the number of miles within each cell. FIG. 7 represents the grid of FIG. 6 including example normalized output values each of the cells. In this example, the normalized output values for cells 610, 620, 630, 640, 650, 660 are 0.11, 0.22, 0.12, 0.01, 0.10, 0.02, respectively. In this regard, cell 620 has a higher likelihood of a disengage occurring than cells 610, 630, and 650. Similarly, cells 610, 630 and 650 have a higher likelihood of a disengage occurring than cells 640 and 660. FIG. 8 is a corresponding heat map 800 generated using these values. However, the relationships between the likelihood of a disengage is more readily discernible in FIG. 7 than in FIG. 8.

For instance, FIG. 9A provides an example heat map generated for cells where a minimum number of driving miles was available (in this example, 500 miles), corresponding segments of routes, and actual disengage events around the area of Mountain View, Calif. In this example, an actual disengage event was an event where an autonomous vehicle transitioned from an autonomous driving mode to a manual driving mode either automatically or because a test driver in the vehicle took control of the vehicle. In addition, the segments were fixed at 0.25 driving miles. As such, the values depicted represent an expected number of disengages likely to occur per each mile driven.

The actual disengage events and log data from the aforementioned driving miles were used to train a model as described above. FIG. 9B is an example heat map generated using the model and inputting the corresponding segments of routes to identify the number of likely disengages along each segment. Again, the values on a scale of 0 to 1, 0 being not likely and 1 being very likely, represent a likelihood of a vehicle disengaging per each 0.25 mile driven. For reference, FIG. 9C represents the error between the predicted and actual disengage events.

Figures 10A, 10B:
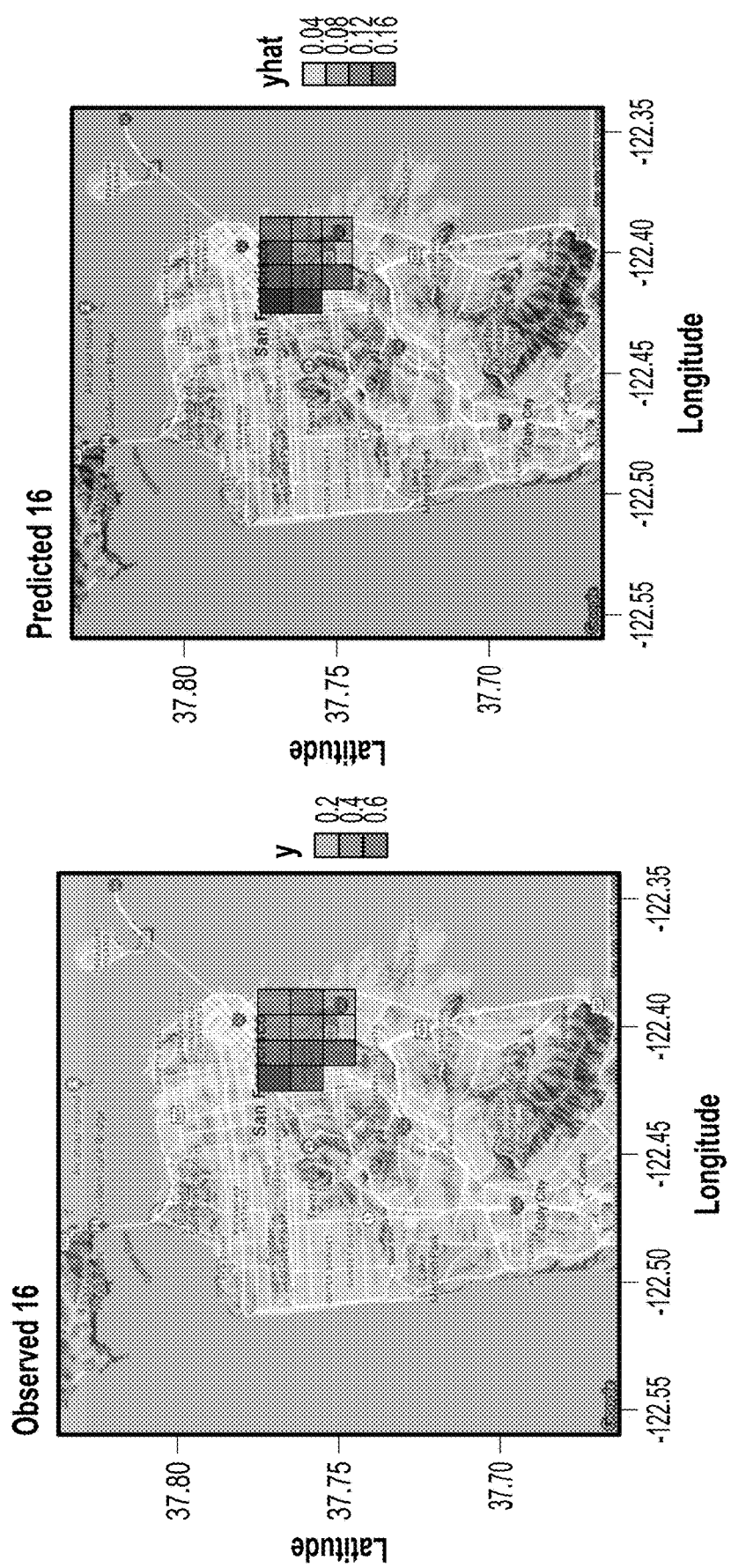
FIGS. 10A-10B are examples of heat maps in accordance with aspects of the disclosure.

FIG. 10A is an example of a heat map generated using actual disengage events in an area of San Francisco, Calif. Again, this example, an actual disengage event was an event where an autonomous vehicle transitioned from an autonomous driving mode to a manual driving mode either automatically or because a test driver in the vehicle took control of the vehicle. In addition, the segments were fixed at 0.25 driving miles. Again, as such, the values on a scale of 0 to 1 represent a likelihood of a vehicle disengaging per each mile driven.

FIG. 10B is an example of a heat map generated by inputting log data segments of routes from miles driven in the manual driving mode in the area of San Francisco, Calif. into the aforementioned model trained on the actual disengage events around the area of Mountain View. In this example, the cells of the grid each had at least 16 miles of log data generated by vehicles driving in an autonomous driving mode in FIG. 10A and in a manual driving mode in FIG. 10B. In addition, the segments were fixed at 0.25 driving miles. Again, as such, the values on a scale of 0 to 1 represent a likelihood of a vehicle disengaging per each mile driven.

In this regard, San Francisco represents a different type of driving experience (e.g. more urban) than Mountain View (e.g. more suburban), yet the heat maps generated using the actual disengage events and predicted likelihood of disengages are fairly consistent. In this regard, actual data generated using this approach demonstrates the ability to achieve reasonable prediction accuracy with a model trained using log data from a different geographic area. This may suggest that different geographic areas (e.g. urban vs suburban) may share some common driving contexts characterizing the driving difficulty. In addition, driving difficulty for areas where there has been very little or no autonomous driving can be reasonably estimated by using the disengage model trained from other areas where such data is available.

The driving difficulty heat maps may be used for various purposes. For instance, the driving difficulty heat maps may be used, for example, by the server computing devices 410, in order to determine which geographic areas should be excluded from a service area for the autonomous vehicles and/or to choose safer and more efficient routes (by avoiding areas that have higher likelihoods of disengages). This can even be done in real time in order to identify which areas of an actual or potential future service area should be excluded or identified to the vehicles of the fleet as non-drivable regions, for example by sending out periodic or as needed updates to the autonomous vehicles of the fleet via network 460. For instance, the heat maps or heat map updates may be stored in memory of the autonomous vehicles (e.g. separately from or incorporated into the aforementioned map information) and accessed as needed. As such, the driving difficulty heat maps can be used to select routes that are more difficult to drive in order to collect more log data (e.g. by vehicles driving in an autonomous driving mode and collecting log data for training and other purposes) more efficiently, better evaluate performance of the autonomous vehicle (e.g. hardware and software), and identify potential or actual issues.

Thus, the features described herein may be used to better understand the driving difficulty of different geographic locations and therefore potentially different driving situations, for instance with different driving conditions (e.g. traffic conditions) at different times of day for autonomous vehicles.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of generating a driving difficulty heat map for autonomous vehicles, the method comprising:
   inputting, by one or more processors, log data generated by a vehicle being driven in a manual driving mode for a segment of a route into a disengage model in order to generate an output identifying a likelihood of a vehicle driving in an autonomous driving mode requiring a disengage from the autonomous driving mode along the segment of the route, the log data being collected within a geographic area;
   generating, by the one or more processors, a grid for the geographic area, the grid including a plurality of cells;
   assigning, by the one or more processors, the output to one of the plurality of cells;
   using, by the one or more processors, the plurality of cells and assigned output to generate a driving difficulty heat map for the geographic area; and
   identifying, by the one or more processors, a geographic area to be excluded from a service area for the autonomous vehicles in real time based on the driving difficulty heat map.

2. The method of claim 1, wherein dimensions of the cells are selected based on a length of the segment of the route.

3. The method of claim 1, wherein the disengage model is a machine learned model trained using log data collected by a vehicle driving in an autonomous driving mode in a second geographic area different from the geographic area.

4. The method of claim 3, further comprising training the disengage model using a number of different types of maneuvers from the log data.

5. The method of claim 3, further comprising training the disengage model using a number of different types of maneuvers per a predetermined driving distance from the log data.

6. The method of claim 1, wherein the output further includes a number of likely disengages along the segment of the route.

7. The method of claim 1, wherein the output further includes a lane-level location of any potential disengages along that segment.

8. A system for generating a driving difficulty heat map for autonomous vehicles, the system comprising one or more processors configured to:
   input log data generated by a vehicle being driven in a manual driving mode for a segment of a route into a disengage model in order to generate an output identifying a likelihood of a vehicle driving in an autonomous driving mode requiring a disengage from the autonomous driving mode along the segment of the route, the log data being collected within a geographic area;

generate a grid for the geographic area, the grid including a plurality of cells;

assign the output to one of the plurality of cells; and use the plurality of cells and assigned output to generate the driving difficulty heat map for the geographic area and identifying, by the one or more processors, a geographic area to be excluded from a service area for the autonomous vehicles in real time based on the driving difficulty heatmap.

9. The system of claim 8, wherein dimensions of the cells are selected based on a length of the segment of the route.

10. The system of claim 8, wherein the disengage model is a machine learned model trained using log data collected by a vehicle driving in an autonomous driving mode in a second geographic area different from the geographic area.

11. The system of claim 10, wherein the one or more processors are further configured to train the disengage model using a number of different types of maneuvers from the log data.

12. The system of claim 10, wherein the one or more processors are further configured to train the disengage model using a number of different types of maneuvers per a predetermined driving distance from the log data.

13. The system of claim 8, wherein the output further includes a number of likely disengages along the segment of the route.

14. The system of claim 8, wherein the output further includes a lane-level location of any potential disengages along that segment.

15. A non-transitory computing device-readable medium on which instructions are stored, the instructions, when executed by one or more processors, cause the one or more processors to perform a method of generating a driving difficulty heat map for autonomous vehicles, the method comprising:

inputting log data generated by a vehicle being driven in a manual driving mode for a segment of a route into a disengage model in order to generate an output identifying a likelihood of a vehicle driving in an autonomous driving mode requiring a disengage from the autonomous driving mode along the segment of the route, the log data being collected within a geographic area;

generating a grid for the geographic area, the grid including a plurality of cells;

assigning the output to one of the plurality of cells; and using the plurality of cells and assigned output to generate the driving difficulty heat map for the geographic area; and identifying a geographic area to be excluded from a service area for the autonomous vehicles in real time based on the driving difficulty heat map.

16. The medium of claim 15, wherein dimensions of the cells are selected based on a length of the segment of the route.

17. The medium of claim 15, wherein the disengage model is a machine learned model trained using log data collected by a vehicle driving in an autonomous driving mode in a second geographic area different from the geographic area.

18. The medium of claim 17, wherein the method further comprises training the disengage model using a number of different types of maneuvers from the log data.

19. The medium of claim 17, wherein the method further comprises training the disengage model using a number of different types of maneuvers per a predetermined driving distance from the log data.

20. The medium of claim 15, wherein the output further includes a number of likely disengages along the segment of the route.

* * * * *